United States Patent [19]

Drury

[11] 4,035,834
[45] July 12, 1977

[54] BEAM LANDING INDICATOR FOR COLOR CATHODE RAY TUBE

[75] Inventor: Anthony M. Drury, Oak Park, Ill.

[73] Assignee: Matsushita Electric Corporation of America, Franklin Park, Ill.

[21] Appl. No.: 676,050

[22] Filed: Apr. 12, 1976

[51] Int. Cl.² ........................................ H04N 9/62
[52] U.S. Cl. .............................. 358/10; 315/13 C; 324/20 CR
[58] Field of Search .......... 358/10, 69; 178/DIG. 4; 335/212-213; 315/13 C, 13 CG, 370, 368; 324/20 CR

[56] References Cited

U.S. PATENT DOCUMENTS

| 3,723,801 | 3/1973 | Oxenham | 315/13 CG X |
| 3,737,716 | 6/1973 | Gerritsen | 335/213 X |
| 3,916,437 | 10/1975 | Barbin | 358/10 |

Primary Examiner—John C. Martin
Assistant Examiner—Aristotelis M. Psitos
Attorney, Agent, or Firm—Drummond, Nelson & Ptak

[57] ABSTRACT

A system for quickly and easily making accurate purity and yoke adjustments of a color cathode ray tube of a television receiver utilizes a separate oscilloscope display of vector beam landing errors. Photocells, provided with filters to cause them to be responsive to selected colors, are placed in front of the cathode ray tube to produce output pulses once for each vertical scan of the beam in the cathode ray tube. A rotational beam landing shift at 15 Hertz is produced by a vertical and horizontal deflection field generated in synchronism with the vertical deflection signal of the cathode ray tube to cause a stepped deflection of the beam in a diamond pattern of up, right, down and left for each successive vertical field. Light variations sensed by the photocell pickup are converted to a 15 Hertz signal which is combined with a 15 Hertz reference signal to control the dot location on the oscilloscope display of the vector beam landing error. Purity adjustments and yoke adjustments then are made on the cathode ray tube by observing the oscilloscope display.

8 Claims, 17 Drawing Figures

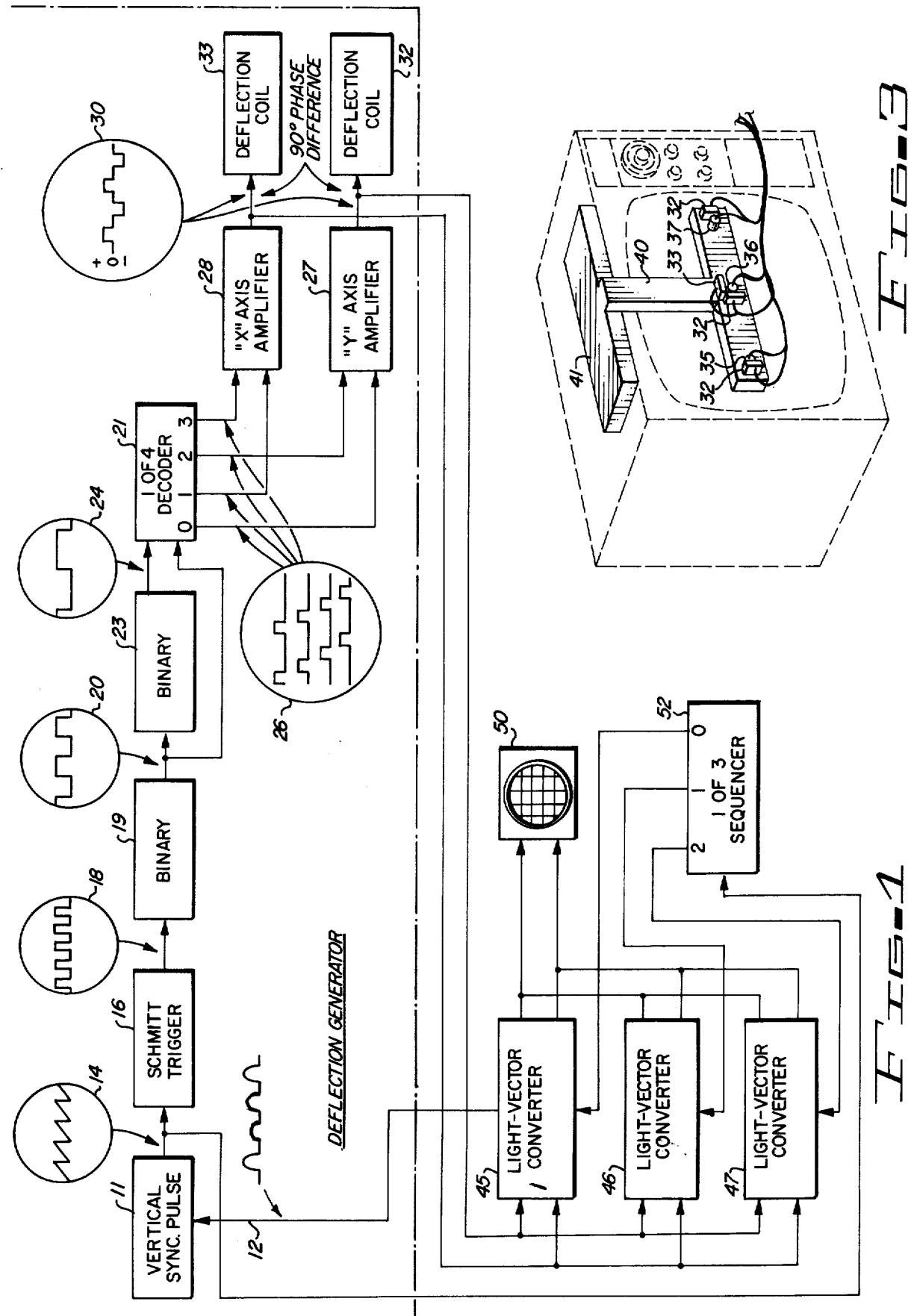

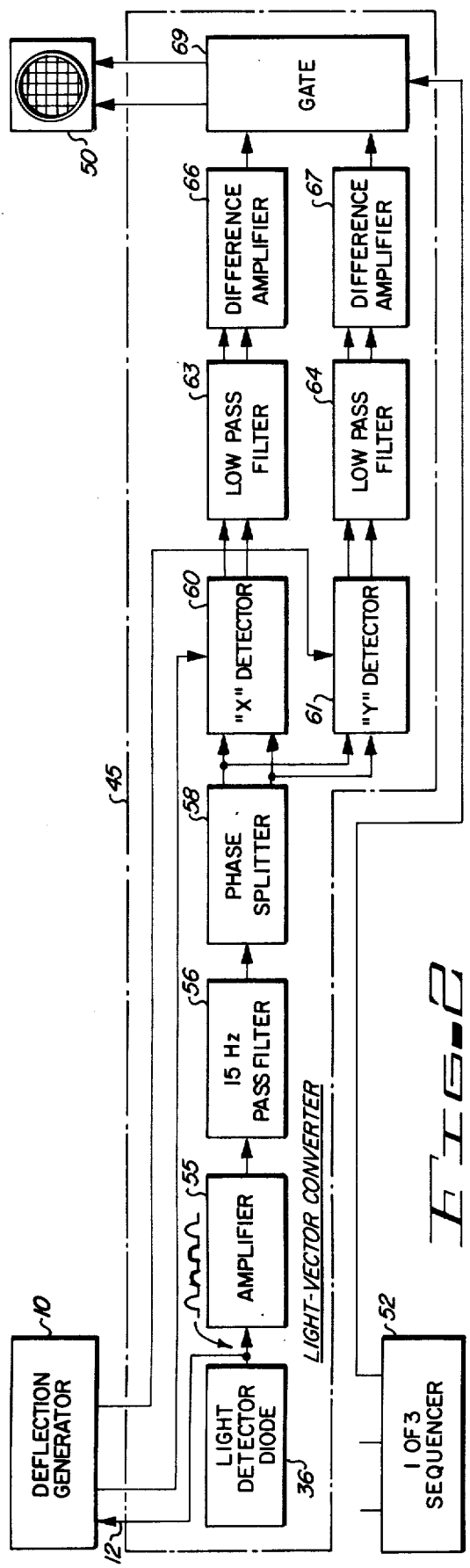
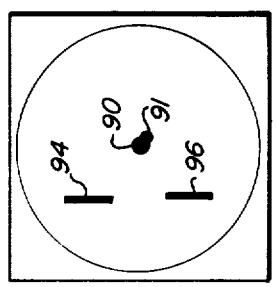
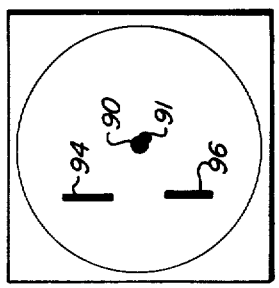
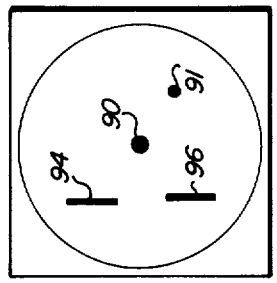
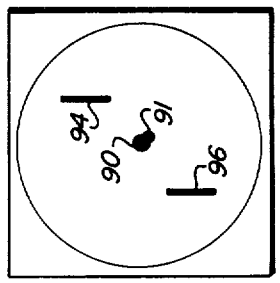
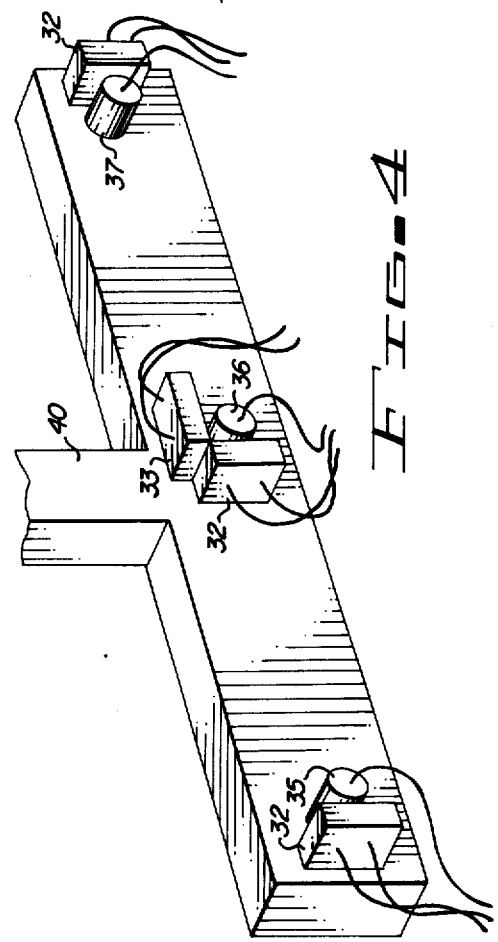

BEAM LANDING INDICATOR FOR COLOR CATHODE RAY TUBE

BACKGROUND OF THE INVENTION

In the manufacture of television receivers, a number of different adjustments are made to the receivers prior to shipping them from the factory to insure the best possible operation of the receiver once it is placed in the customer's home. For color television receivers, one of the adjustments which must be made is an adjustment of color purity. Each television receiver has purity adjustment magnets or rings on the neck of the cathode ray tube to cause the electron beams to strike the correct phosphor dots for the desired colors, thereby causing the "purity" of the colors reproduced on the cathode ray tube screen to be as close as possible to the ideal or perfect color reproduction which the receiver is capable of achieving.

Generally, one or the other of two methods of adjusting color purity of a television receiver during its manufacture or at a service center is used. One of these is the "microscope" method, and the other is known as the "red-ball" method. Both of these adjustments are made after the receiver has reached its normal operating temperature, so that the temperature of the shadow mask on the picture tube has been stabilized.

The microscope method is used to observe directly the landing positions of the electron beams of the cathode ray tube relative to the phosphor dot triads. This is accomplished by observing the triads in a microscope and adjusting the purity magnets, so that the three electron beams all land correctly on their appropriate phosphor dots at the center of the screen. Ideally, the beams land on the geometric centers of the phosphor dots, and this can be observed through the microscope. Relatively complex apparatus, such as a periscope or the like, is necessary in addition to the microscope in making a purity adjustment by this method. It also is relatively time consuming and restrains the operator making the adjustment to the physical location of the microscope.

The red-ball method of making a purity adjustment is accomplished with only the red gun of the cathode ray tube operating. The deflection coil assembly is pulled back on the neck of the cathode ray tube as far as it will go to place a red ball on the center of the cathode ray tube screen. The purity magnets are adjusted so that the center of the red ball is at the center of the cathode ray tube screen. If the cathode ray tube has a center beam landing precompression feature, the red ball is adjusted to be located slightly offset from the screen center in the direction of the red gun of the tube. Once the purity magnets have been adjusted to accomplish this location of the red ball, the yoke assembly is relocated to its correct axial position and final adjustments are made to give a pure red raster over the entire screen. The determination of the proper location of the red ball for the purity adjustment and the determination of the purity of color of the red raster over the entire screen are subjective determinations made by the operator effecting the adjustments.

The red-ball purity adjustment method is a popular one because of its simplicity. This method, however, only results in an approximate purity setting, since the purity adjustment is effected with the deflection yoke pulled back from its normal operating position. The error introduced by making the purity adjustment in this manner generally is small enough that it does not noticeably affect the operation of the cathode ray tube. It is possible, however, to make a purity adjustment by this method which includes substantial error significant enough to be readily observable when the television receiver is subsequently operated.

Another method which has been developed for making a color purity adjustment is a modification of the red-ball method. This modified method operates with the deflection yoke assembly of the cathode ray tube in its normal operating position. The red gun then is placed in operation, the green and blue guns are turned off. A circular coil then is placed in front of the screen on which the unmodulated red raster is displayed. A direct current is passed through the coil and the resulting field rotates the beam landing around the center of the coil to cause a clearly defined red ball to appear at the approximate center of the coil. The actual location of the ball depends upon the adjustment of the color purity magnets which then can be adjusted until the red ball appears in the center of the auxiliary coil. To aid the operator in making a purity adjustment with this method, a template may be positioned inside the coil to indicate the size and location of the red ball for a properly adjusted receiver. In this system, the final yoke adjustment for establishing the purity at the sides of the cathode ray tube, however, is done in the same manner as with the red-ball method previously described. A subjective determination of the location of the red ball and of the overall color purity when the yoke adjustment is made still occurs in the practice of this method.

It is desirable to provide an apparatus and method for adjusting the purity of the cathode ray tube of a color television receiver which removes, to as great an extent as possible, the subjective determination of the operator making the adjustment. It also is desirable to effect purity adjustments of a color cathode ray tube quickly and simply with a minimum chance for operator error and with a minimum amount of subjective determination on the part of the operator making the adjustments.

SUMMARY OF THE INVENTION

Accordingly, it is an object of this invention to provide a system for indicating beam landings of a cathode ray tube.

It is another object of this invention to provide a system for indicating purity adjustments of a color cathode ray tube.

It is another object of this invention to provide an improved method for making a purity adjustment of a color cathode ray tube.

It is an additional object of this invention to provide a beam landing indicator for a color cathode ray tube.

It is a further object of this invention to provide a visual display representative of beam landing errors of a color cathode ray tube.

In accordance with a preferred embodiment of this invention, a system for indicating the beam landing of a color cathode ray tube includes apparatus for creating an auxiliary magnetic field in the region of the electron beam of the color cathode ray tube. The auxiliary magnetic field is stepped or rotated according to a fixed cyclical pattern to effect a corresponding rotation or stepped relocation of the beam landings of the cathode ray tube beam. A light sensing diode is located to sense the light emitted from the phosphors of at least one color on the cathode ray tube display screen, and a control circuit is coupled between the sensing circuit and the circuit for stepping the magnetic field to effect the rotation of the auxiliary magnetic field in synchronism with the scanning of the beam of the cathode ray tube. A display oscilloscope is coupled with the light sensing diode and the control circuit for effecting a display representative of beam landing errors. This display then may be utilized by an operator viewing the display to effect purity adjustments of the purity rings on the cathode ray tube yoke.

BRIEF DESCRIPTION OF THE DRAWINGS

FIG. 1 is a block diagram of a preferred embodiment of the system;

FIG. 2 is a block diagram showing additional details of a portion of the circuit of FIG. 1;

FIG. 3 shows apparatus used in conjunction with the circuits of FIGS. 1 and 2;

FIG. 4 is an enlarged detail of a portion of the apparatus of FIG. 3;

FIGS. 5-8 are illustrations of oscilloscope displays useful in explaining the operation of the circuit of FIGS. 1 and 2;

DETAILED DESCRIPTION

Figure 9A:
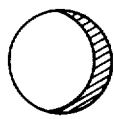
FIGS. 9 and 10 are additional illustrations useful in explaining the operation of the system shown in FIGS. 1 and 2.
Figure 9B:
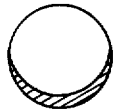
Figure 9C:
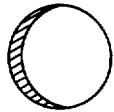
Figure 9D:
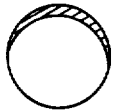

Referring now to the drawings, the same reference numbers are used throughout the several figures to designate the same components.

The system which is disclosed is particularly useful as a beam landing indicator system, having a unique ability to detect beam landing errors on the screen of a color television receiver cathode ray tube. This detection ability may be used in the manufacture of color television cathode ray tubes or in the manufacture of the color television receivers themselves to effect purity adjustments and yoke adjustments of the television receiver. Such adjustments may be made by the color cathode ray tube manufacturer, the color television set manufacturer, or a television service shop in adjusting color television receivers for optimum performance.

Referring now to FIGS. 1 and 3, there is shown in FIG. 3 a typical color television receiver (shown in dotted lines) with which the beam landing indicator system of the preferred embodiment of this invention may be used. In FIG. 1, there is shown a deflection generator 10 which operates to supply stepped sequences of deflection signals to horizontal and vertical deflection coils 32 and 33 located so that the magnetic field produced by the coils deflects the beam produced in the cathode ray tube of the television receiver in accordance with the deflection signals passing through the coils 32 and 33.

The deflection generator 10 includes a synchronized oscillator 11 which is supplied with synchronization pulses 12 at the vertical scanning deflection rate of the cathode ray tube of the television receiver with which the system is being used. The pulses appearing on the lead 12 are synchronized with the operation of the cathode ray tube of the receiver. The manner in which this is accomplished is described subsequently in conjunction with the circuit of FIG. 2. These pulses, however, synchronize the operation of the oscillator 11 at the vertical scanning rate of the receiver to produce a sawtooth signal 14 at the vertical rate (60 Hertz in the NTSC television signal presently used in the United States). The sawtooth pulses 14 are applied to a Schmitt trigger circuit 16 to produce a square-wave signal 18, also at the 60 Hertz vertical scanning rate. The signals produced by the Schmitt trigger circuit 16 then are supplied to a binary divider circuit 19 to produce a 30 Hertz binary signal 20. The output of the binary divider circuit 19 is applied to one of two inputs to a one-of-four decoder circuit 22 and also is applied to the input of a second, cascaded binary divider circuit 23 which produces an output signal waveform 24 at a 15 Hertz frequency. The two signals from the binary dividers 19 and 23 applied to the input of the decoder circuit 22, which may be a suitable coincidence gate circuit, result in a recurring sequence of staggered output pulses 26 appearing on the four output leads of the decoder circuit 22.

The even-numbered outputs of the decoder circuit 22 are applied to a Y axis amplifier circuit 27, and the odd-numbered outputs of the decoder circuit 22 are applied to the inputs of an X axis amplifier circuit 28, each of which produces an output waveform 30 in a conventional manner. It should be noted that the waveforms 30 are produced at the outputs of the amplifiers 27 and 28 are 90° out of phase with one another, due to the nature of the sequence of output signals from the decoder circuit 22. These two out-of-phase signals then are applied to a Y deflection coil 32 and an X deflection coil 33, respectively, to produce vertical and horizontal magnetic deflection fields acting upon the beam of the cathode ray tube with which the system is used.

The Y axis deflection coil 32 is located to effect a horizontal deflection of the cathode ray tube beam and the X axis deflection coil 33 is located to effect a vertical deflection of the beam. As shown in FIG. 3, these deflection coils may be located adjacent photoelectric detection diodes 35, 36 and 37, which are conveniently held in an inverted T shape holder 40 adjacent the face of the television receiver cathode ray tube. The diodes 35, 36 and 37 sense the light emitted from the phosphors on the cathode ray tube screen when these phosphors are struck by the electron beam of the cathode ray tube. Typically, the photoelectric light detector diodes 35, 36 and 37 have a color filter placed between them and the face of the cathode ray tube so that they respond to only one color, such as red or green.

The holder 40 has an upper support portion 41 which is made to rest on the top of the television receiver cabinet, and the length of the depending arm on the holder 40 extending from the top portion 41 is selected to place the light detector diode 36 at approximately the vertical midpoint of the cathode ray tube screen. Similarly, the holder 40 is located to place the diode 36 at the approximate horizontal center of the cathode ray tube screen and the diodes 35 and 37 then are located near the left and right-hand edges of the cathode ray tube display screen. The arm on which the diodes 35, 36 and 37 are mounted has openings in it to permit light from the screen of the cathode ray tube to impinge upon the diodes.

In operating the system to check the beam landing of the beam of the cathode ray tube of the television receiver under test, the signals supplied to the cathode ray tube of the receiver are selected to cause only one gun of the receiver to be operative. For example, if the system is used with a red filter over the light input side of the light detector diodes 35, 36 and 37, only the red gun of the cathode ray tube is operated to produce a pure red raster over the entire screen when the set is properly adjusted. However, other guns for other colors could be used instead of red, if desired.

Each time the vertical scan of the television receiver causes the phosphors immediately adjacent the light detector diode 36 to be energized to emit light, a pulse is produced by the diode 36. The pulses from the diode 36 constitute the sequence of pulses at the vertical scanning rate which are applied over the lead 12 to the oscillator 11 to synchronize the operation of the deflection generator 10 with the vertical raster generated by the television receiver under test.

Because of the operation of the two binary dividers 19 and 23, the output signals 30 from the Y and X axes amplifiers 27 and 28 are 15 Hertz signals. The amplitudes of the signal outputs from the amplifiers 27 and 28 are dependent upon the characteristics of these amplifiers and are consistent irrespective of the amplitude of the pulses applied over the lead 12 to the synchronous oscillator 11. Because the signals 30 at the outputs of the amplifiers 27 and 28 are 90° out of phase, the deflection field produced by the deflection coils 32 and 33 is stepped in a square or diamond pattern to produce a clockwise rotation of the beam landing shift of the beam of the cathode ray tube. This rotation is in stepped increments which occur once each vertical field of the television raster of the receiver under test.

The outputs of the Y and X axes amplifiers 27 and 28 are applied in parallel to three light-vector converter circuits 45, 46 and 37, which have their outputs connected in parallel to the horizontal and vertical deflection coils of a display oscilloscope 50. Each of the light-vector converters 45 through 47 receives input signal pulses from a corresponding one of the three light detector diodes, diode 36 (in the converter circuit 45), diode 35 (in the converter circuit 46) and diode 37 (in the converter circuit 47). The diodes and the converter circuits 45, 46 and 47 convert the light variations picked up by the light detector diodes to 15 Hertz signals which are combined with the 15 Hertz reference signals applied to the converters 45, 46 and 47 from the Y and X axes amplifiers 27 and 28 to produce corresponding vertical and horizontal deflection signals to the display oscilloscope 50.

The outputs of the converters 45, 46 and 47 are connected together in parallel, and a one-of-three sequencer circuit 52 sequentially gates or selects the outputs of the converter circuits 45 through 47 one at a time for display on the screen of the oscilloscope 50. This selection may be effected under control of the output of the oscillator 11, and is on a continuous cyclical step-by-step basis. The sequencer circuit 52 typically is a conventional ring counter or similar circuit. Thus, the display on the oscilloscope 50 is obtained from the output of a different one of the converters 45 through 47 on a continuous repeating cycle.

Referring now to FIG. 2, a more detailed block diagram of the light-vector converter circuit 45 is shown. The circuit 45 is representative of all three light-vector circuits 45, 46 and 47, and a description of operation of the circuit of FIG. 5 also applies equally as well to the operation of the converter circuits 46 and 47. As stated previously, the input element of the light-vector converter circuit 45 is the light detector diode 36, which is located on the frame 40 to sense the illumination changes of the phosphors located generally at the center of the cathode ray tube screen of the television receiver with which the system is being used. If a red raster is being displayed, the light detector diode 36 is provided with light input through a red filter. As stated previously, if other color raster displays are desired, different colored filters can be provided for the light detector diode input. The particular color selected is not important to an understanding of the operation of the system.

The output of the light detector diode 36 comprises a sequence of pulses occurring at the 60 Hertz vertical scanning rate of the television receiver. The 60 Hertz pulses are applied over the lead 12 to the deflection generator 10, as described previously, to sychronize the operation of the deflection generator 10 with the operation of the television receiver with which the system is being used.

The 60 Hertz output pulses from the light detector diode 36 also are applied through an amplifier 55 and through a narrow-band 15 Hertz pass filter 56 to a phase splitter circuit 58. The two outputs of the phase splitter circuit 58 are applied in parallel to an X detector circuit 60 and a Y detector circuit 61, each of which comprise a balanced demodulator circuit having the corresponding X and Y reference signals obtained from the X axis amplifier 28 and Y axis amplifier 27, respectively, applied to them as a reference signal.

Since the 15 Hertz pass filter 56 blocks out the 60 Hertz signal components from the output of the amplifier 55, no output signal is passed by the filter 56 if the beam landing adjustment of the television receiver is correct. Signal variations at 15 Hertz, however, do occur in the output of the light detector diode 36 for misadjusted television receivers in which the beam landing varies as it is rotated under control of the deflection coils 32 and 33. These variations are evidenced as variations in the amplitude of the 60 Hertz pulses at the output of the light detector diode 36, and such amplitude variations are in the form of 15 Hertz signals which are passed by the filter 56. The 15 Hertz variations, in turn, are applied to the detector circuits 60 and 61 and result in low frequency (nearly DC) output signals from the detector circuits 60 and 61. The detected output signals are applied through low-pass filters 63 and 64 to respective difference amplifiers 66 and 67 to form the X and Y output deflection signals for driving the display of the cathode ray tube 50. These signals are gated to the cathode ray tube 50 by a gating circuit 69 which is enabled by the one-of-three sequencer circuit 52 in the manner described previously in conjunction with FIG. 1.

The manner in which the circuit of FIG. 2 operates may be more readily understood with a reference to FIGS. 9 and 10. The purpose of the light-to-vector converters 45, 46 and 47 is to transform the amplitude and phase variations in the output signals from the light detector diodes to vectors which are displayed on the screen of the display oscilloscope 50. These variations in light output are in turn caused by variations in the negative beam landing, resulting from the rotational stepping of the beam caused by the deflection coils 32 and 33. As stated previously, these deflection coils 32 and 33 move the beam to a different position after each field of the raster display on the screen of the television receiver, the beam cyclically going through a diamond pattern of movement of up, right, down, left.

FIGS. 9A through 9D show the negative landing of the beam caused by this rotational stepping, where the beam landing is correct in the receiver. In such a case, there is no 15 Hertz signal passed by the filter 56 in the light-vector converter circuits 45, 46 and 47. This result occurs because there is no change in the light output emitted from the phosphor dots as the deflection generator steps through its sequence of operation. This can be determined by an examination of FIGS. 9A, 9B, 9C and 9D in which the dark area of each of the circles representative of a phosphor dot is the same, although the dark area is located in a different quadrant in each of these figures. The different quadrant occurs because of the four different 90° rotational steps which are induced to the beam of the cathode ray tube by the operation of the deflection generator and the deflection coils 32 and 33.

For different receivers, the negative landing or dark area of the phosphor dots being illuminated by the beam may vary because of the manufacturing tolerances of the receiver, but the best purity adjustment for the beam landing occurs when there is no difference in the light outputs as the beam is stepped through all four of these steps in a cyclical manner. When this occurs, the X and Y outputs from the difference amplifiers 66 and 67 of the light-vector converters 45 through 47 are zero, and no inputs are applied to the deflection coils of the cathode ray tube 50. As a consequence, the display on the screen of the display oscilloscope 50 merely is a dot located at its center.

FIG. 10 shows a sequence of phosphor dot illumination similar to that of FIG. 9. In FIG. 10, however, a beam landing error is indicated. In the rotational sequence illustrated in FIGS. 10A through 10D, a 15 Hertz signal is produced at the output of the light detector diode, such as the diode 36, because of the difference in illumination of the phorphor dots shown in the quadrants of FIGS. 10B and 10D. The amplitude of the output pulses from the light detector diode is dependent upon the amount of light output from the phosphor dots.

Figure 10A:
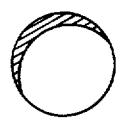
Figure 10B:
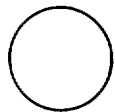
Figure 10C:
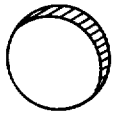
Figure 10D:
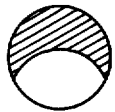

It is apparent that the amplitude of the illumination of the dot in FIG. 10B produces a maximum amplitude output pulse, whereas the illumination of the dot in the quadrants shown in FIGS. 10A and 10C is somewhat less, but equal for each of these two quadrants. The output amplitude from the signals of the light detector diode for the quadrant shown in FIG. 10D is substantially less than that shown for any of the other quadrants. This amplitude variation results in a 15 Hertz signal which is passed by the filter 56. In turn, the amplitude of the signals obtained from the difference amplifiers 66 or 67, or both of these, depends upon the amount of difference in the detected light outputs.

FIGS. 5, 6, 7 and 8 are representations of typical displays which appear on the face of the oscilloscope 50 during operation of the system shown in FIGS. 1 and 2. The generation of these displays is best understood in conjunction with a description of the operation of the circuit shown in FIG. 11. The circuit of FIG. 11 is a detailed schematic diagram of a typical detector low-pass filter, difference amplifier and gate chain, as used in conjunction with the X and Y detectors 60 and 61, and the following output sections of the light-vector converters 45, 46 and 47.

Figure 11:
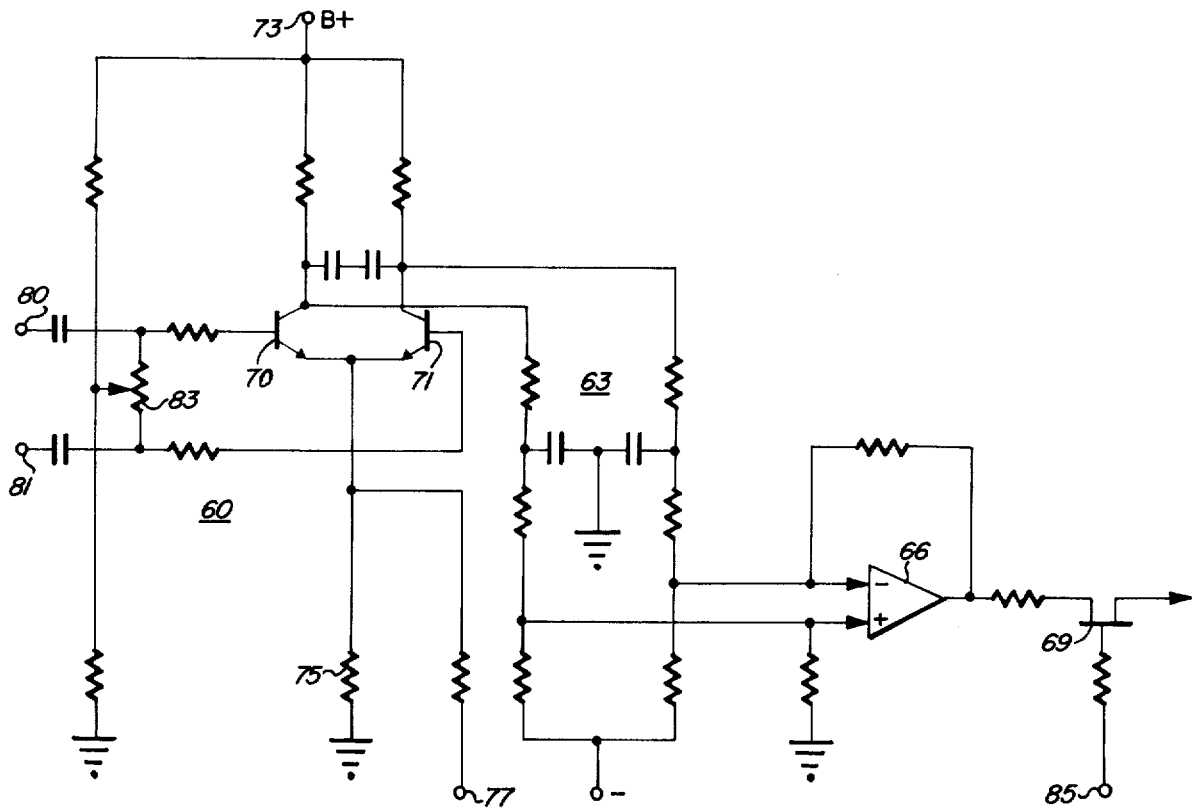
FIG. 11 is a detailed circuit diagram of a portion of the circuit shown in FIG. 2.

In FIG. 11, the circuit is identified as comprising the X detector 60, the low-pass filter 63, the difference amplifier 66, and one-half of the gate circuit 69. It should be understood that the Y detector 61, low-pass filter 64, difference amplifier 67 and the other half of the gate 69 of the light-vector converter 45 are exactly the same as the circuit shown in FIG. 11. Similarly, the comparable circuit combinations of the light-vector converter circuits 46 and 47 also have circuitry which is the same as that shown in FIG. 11. Thus, the description of the operation of the circuit of FIG. 11 is to be understood as also encompassing the operation of the comparable circuits in the light-vector converter circuits 45, 46 and 47.

The X detector circuit 60 comprises a differential amplifier demodulator circuit including a pair of NPN transistors 70 and 71, the collectors of which are connected to a suitable source of B+ operating potential (not shown) applied to a terminal 73. The emitters of the transistors 70 and 71 are connected together through a resistor 75 to ground. In addition, these emitters are coupled to an X reference signal input terminal 77 which is supplied with reference signals from the output of the X axis amplifier 28 (FIG. 1). The signal on the terminal 77 constitutes the reference signal for operating the detector circuit 60; and, as described previously, comprises a 15 Hertz signal synchronized with the scanning raster of the television receiver under observation.

The two output signals from the phase splitter circuit 58 are applied to a pair of input terminals 80 and 81, respectively. Prior to operating the system, the detector circuit 60 is adjusted for a balanced signal output by disconnecting the deflection coils 32 and 33 from operation. This is done to insure that the proper reference signal is present. A constant level of 60 Hz of brightness signal pulses is detected by the light detector diode 36, and no signals are applied to the terminals 80 and 81. With this operating condition, a centering potentiometer 83 is adjusted so that the output signals obtained from the collectors of the transistors 70 and 71 are equal. These output signals are then filtered by the low-pass filter network 63 to comprise a pair of DC input signals to the difference amplifier 66. So long as these signals are equal, no output is obtained from the difference amplifier 66; and when the gate circuit 69 is enabled by the application of a gating pulse to a terminal 85 from the sequencer circuit 52 (FIGS. 1 and 2), no output signal is obtained from the gate 69. When this occurs from both the X and Y detector circuits 60 and 61 of the light-vector converter 45, no deflection signals are applied to the deflection coils of the oscilloscope 50; and the display comprises a dot at the center of the screen of the oscilloscope 50.

The screen of the oscilloscope 50 has a target dot 90 displayed at its center, and this dot is produced by briefly returning to zero before the one-of-three sequencer circuit 52 switches from one light-vector converter to another, so that it is continuously renewed. The observer of the oscilloscope 50 sees the dot 90 as a continuous dot due to the averaging caused by the eye and the duration of the fluorescence of the phosphors used on the screen of the oscilloscope 50. For the light-vector converter 45, a signal dot 91 is generated in response to the X and Y deflection signals obtained from the output of the difference amplifiers 66 and 67. In making the zero balancing or "no signal" adjustment described above, the signal dot 91 is caused to coincide and overlie the target dot 90 on the display screen of the oscilloscope 50. In this condition of operation, only one dot is visible to the operator of the system.

Now assume that the deflection signals for rotating the beam of the television receiver under observation are applied to the deflection coils 32 and 33. This causes a rotational stepping of the beam landing, as illustrated in FIGS. 9 and 10. If the beam landing is uniform in all four quadrants, as illustrated in FIGS. 9A through 9D, the amplitude of all the pulses from the diode 36 is the same and there is no signal passed by the filter 56, as described previously. This means that the output of the phase splitter 58 is zero, the same as if no rotational stepping of the beam were taking place; and the signal dot 91 coincides precisely with the target dot 90 on the display of the oscilloscope 50. If, however, a signal condition similar to that illustrated in FIGS. 10A through 10D exists, a 15 Hertz signal is passed by the filter 56 to the phase splitter 58. With the conditions shown in FIG. 10 however, the phase of this signal is out of phase with the X reference signal applied to the terminal 77 by 90°, so that it does not have any affect on unbalancing the detector 60. As a consequence, the two inputs to the difference amplifier 66 continue to be balanced and no X deflection signal is obtained from the output of the gate 69.

The Y detector 61, however, is of the same configuration as the circuit shown in FIG. 11 and the Y signals occurring during the quadrants illustrated in FIGS. 10B and 10D produce a 15 Hertz variation signal which is either in phase or 180° out of phase with the Y reference detector 61. When this occurs, a substantial unbalance exists in the two inputs to the difference amplifier 67 associated with the Y detector 61. The amount of the unbalance depends upon the amount of difference (amplitude) in the light outputs produced by the beam landings illustrated in FIGS. 10B and 10D. As a consequence, the Y channel will have an output causing a corresponding deflection signal to be gated through the gate 69 when the gating pulse 85 is applied to the gate.

Of course, in a normal situation there will be some signal components which effect an unbalance of both the X detector 60 and the Y detector 61, thereby resulting in some signals being applied to both the X and Y deflection coils of the oscilloscope 50 each time the gates 69 of the light-vector converter 45 are enabled to pass signals from the difference amplifiers 66 and 67. This results in corresponding X and Y displacement of the signal dot 91 from the target dot 90 as shown in FIG. 5. The operator of the system can observe this displacement and then adjust the purity rings or purity magnets on the deflection yoke of the cathode ray tube of the television receiver under test to cause movement of the signal dot 91 toward the target dot 90.

As stated previously, for a set having perfect alignment and accurate purity adjustment, the signal dot 91 should exactly overlie the target dot 90. Because of limited operator time, however, a small error in center setting is accepted, and the operator adjusts the signal dot 91 to come as close as possible to the signal dot 90 on the display screen of the oscilloscope 50. This adjustment for a typical television receiver is illustrated in FIG. 6. Once the adjustment has been made to get the signal dot 91 as close to the target dot 90 as possible, the set has its purity adjustment effected as precisely as possible for the cathode ray tube used in the particular television receiver being adjusted. It is not necessary for the operator to observe the purity of the color displayed on the screen of the television receiver. In fact, it is very difficult to detect changes in the color purity by observing the screen, even though fairly wide range of movement of the signal dot 91 with respect to the target dot 90 may be effected during the adjusting procedure. The adjustment is executed quickly and precisely and results in a better adjusted receiver than generally is possible by observing color purity shifts in the display itself.

For the light-vector converters 46 and 47, which have the light detectors 35 and 37, respectively, in them, a slightly modified signal representation on the oscilloscope screen 50 is employed. The center light detector diode 36 is sufficient to effect a proper purity adjustment for the receiver. In addition to a purity adjustment, however, the deflection yoke of the receiver must be placed in a proper position axially on the neck of the cathode ray tube to achieve the optimum overall purity at the edges of the cathode ray tube screen. Once the center purity adjustment has been made, the further adjustment can be accomplished by a left to right or horizontal stepping of the beam of the cathode ray tube only. No vertical stepping of the beam then is necessary to properly determine the yoke location. As a consequence, only an X deflection coil 32 is necessary in conjunction with the stepping or movement of the beam when it is in the region of the light detector diodes 35 and 37. Thus, there also is no necessity for a Y detector 61 or the low-pass filter and difference amplifiers 64 and 67 in the light-vector converters 46 and 47.

In addition, in order to differentiate the displays on the screen of the oscilloscope 50 produced in response to the operation of the light detector diodes 35 and 37, a triangular sawtooth voltage is applied to the difference amplifier 66 in the light-vector converter circuits 46 and 47 to effect a vertical lengthening of the signal passed through the corresponding gate 69 to the oscilloscope 50. This results in the production of a vertical bar display 94 associated with the output of the light-vector convertor 46 and a vertical bar display 96 produced in response to the output of the light-vector converter 47. These bars 94 and 96 move in opposite directions horizontally on the face of the display oscilloscope 50 as the yoke is moved back and forth on the neck of the cathode ray tube of the television receiver. The optimum purity adjustment for the edges of the cathode ray tube of the receiver is achieved when the bars 94 and 96 are vertically aligned with one another. This adjustment is indicated in FIGS. 5, 6 and 8.

Typically, after the signal dot 91 is moved as close as possible to the target 90, the bars 94 and 96 occupy vertically displaced positions on the display screen of the oscilloscope 50, as shown in FIG. 7. The operator, adjusting the yoke location of the television receiver under test, then moves the yoke back and forth until the two bars 94 and 96 are aligned vertically, as shown in FIG. 8. For a color cathode ray tube which is precisely manufactured to perfect alignment in all respects, the signal dot 91 and the vertical bars 94 and 96 all overlie one another at the target center 90 on the screen display of the oscilloscope 50. Because of manufacturing tolerances, however, a final display for a well adjusted color television receiver generally appears similar to the displays which are illustrated in FIGS. 6 and 8.

The foregoing description has been made in conjunction with the placement of relatively small deflection coils 32 and 33 adjacent the locations of the light detector diodes on the frame 40. Such location of deflection coils adequately serves the purpose of controlling the beam deflection for making the adjustments which have been described. It is possible, however, to effect a similar stepping or rotational movement of the beam in the cathode ray tube on a television receiver manufacturing line by use of a common Helmholtz coil which completely surrounds the work location at which the adjustments are being made. Helmholtz coils commonly are employed in television receiver assembly lines for nullifying the effects of the earth's magnetic field to enable an operator to make certain critical adjustments to the television receiver. While the set is located within the Helmholtz coil, however, the X and Y stepped deflection signals also can be applied to it to achieve the same result which is described above in conjunction with the locally placed deflection coils 32 and 33.

It also should be noted that in place of the oscilloscope display 50, it is possible to use meters for the X and Y deviation indication. A single meter using crossed pointers or two separate meters could be employed with target locations marked on the meters to identify the "perfectly adjusted" purity reading. It has been found, however, that the visual display provided by the oscilloscope 50 is most convenient to enable an operator to quickly make the necessary purity and yoke adjustments.

I claim:

1. A beam landing indicator system for a color cathode ray tube including in combination:
    first means for creating an auxiliary magnetic field for deflecting the electron beam in the cathode ray tube;
    second means coupled with said first means for changing said magnetic field according to a predetermined pattern;
    light sensing means located to sense light emitted from phosphors of one color from the cathode ray tube; and
    an oscilloscope, the deflection coils of which are coupled in circuit with said second means and said light sensing means for producing a vector indication of the beam landing adjustment of the color cathode ray tube.

2. The combination according to claim 1 wherein said second means causes the auxiliary magnetic field to be rotated according to said predetermined pattern and at a submultiple of the vertical scanning frequency of the color cathode ray tube.

3. The combination according to claim 1 further including control means coupling said light sensing means with said second means for effecting the rotation of the auxiliary magnetic field in synchronism with the scanning of the electron beam of the cathode ray tube.

4. The combination according to claim 3 wherein said rotation of the auxiliary magnetic field is effected at a submultiple of the vertical scanning frequency of the electron beam in said cathode ray tube.

5. The combination according to claim 1 wherein said light sensing means is responsive to light of a single predetermined color and is located approximately at the center of the display screen of the color cathode ray tube for producing output pulses at the vertical scanning rate of the electron beam in the cathode ray tube, said output pulses having an amplitude corresponding to the illumination of the phosphor dots on the screen of the cathode ray tube of said predetermined color, and further including means coupling said light sensing means with said second means for effecting a stepped rotation of the auxiliary magnetic field in synchronism with the scanning of the electron beam of the color cathode ray tube and at a submulitple of the vertical scanning frequency.

6. The combination according to claim 1 wherein said means for creating an auxiliary magnetic field comprises horizontal and vertical deflection coils mounted in close proximity to said light sensing means.

7. A method of sensing and displaying electron beam landing errors of a color television cathode ray tube, comprising the steps of:
    subjecting the electron beam of the cathode ray tube to a rotational beam landing shift at a predetermined frequency;
    sensing variations in the emitted light from phosphors of a predetermined color on the face of the cathode ray tube;
    converting the sensed light variations to a signal of said predetermined frequency;
    combining said converted signal at said predetermined frequency with a reference signal at said predetermined frequency to produce vector indicia of the magnitude and direction of beam landing error; and
    displaying said vector indicia of beam landing error as a mark on the screen of a display oscilloscope.

8. The method according to claim 7 wherein said rotational beam landing shift is produced at a frequency of 15 Hertz, wherein the sensed emitted light variations also are converted to a 15 Hertz signal.

* * * * *